July 28, 1959    J. B. JOHNSON    2,897,485
HEAT DETECTOR FOR HYDROCARBON FLAMES
Filed April 7, 1955

INVENTOR
John B. Johnson
BY
George H. Fritzinger
Agt.

United States Patent Office 2,897,485
Patented July 28, 1959

2,897,485

HEAT DETECTOR FOR HYDROCARBON FLAMES

John B. Johnson, Maplewood, N.J., assignor, by mesne assignments, to McGraw-Edison Company, Elgin, Ill., a corporation of Delaware Application April 7, 1955, Serial No. 499,913

6 Claims. (Cl. 340—227)

This invention relates particularly to fire alarms for vehicles such as aircraft and more broadly to heat detectors which are selectively responsive to heat sources having characteristic emission spectra.

My invention takes advantage of the observation that different heat radiation sources, particularly flames, emit radiation strongly at particular characteristic frequencies in their emission spectra. The emission spectrum of a hydrocarbon flame shows, for example, that the radiation is strongest in a narrow band at about 4.5 microns. The strong radiation at 4.5 microns comes from the carbon dioxide molecules in the flame.

When a particular gas in a flame causes the flame to have a sharply peaked emission characteristic, that same gas outside the flame will have an equally sharp absorption characteristic. Thus, carbon dioxide gas outside the flame will absorb the peak energy in the emission spectrum of the hydrocarbon flame. In accordance with my invention, as will appear, a selective flame detector of a balanced type is devised by utilizing the selective absorption of the same gaseous element as that which provides the characteristic strong emission in a narrow band of the radiation spectrum of the flame to be detected. In this way a detector is provided which will respond selectively to radiation from one type of flame but which will be unresponsive to other types of radiation even though the emission spectra of the different sources of radiation may overlap.

An object of my invention is to provide stable and dependable detectors for different types of flames.

Another object is to provide such detectors which are unresponsive to heat sources other than the particular flame to be detected.

Another object is to provide stable fire detectors for aircraft or other vehicles or devices subject to a fire hazard from a particular type of flame.

A specific object of the invention is to provide a simple detector of novel form for detecting hydrocarbon flames.

In the description of my invention reference is had to the accompanying drawings, of which:

Figure 1:
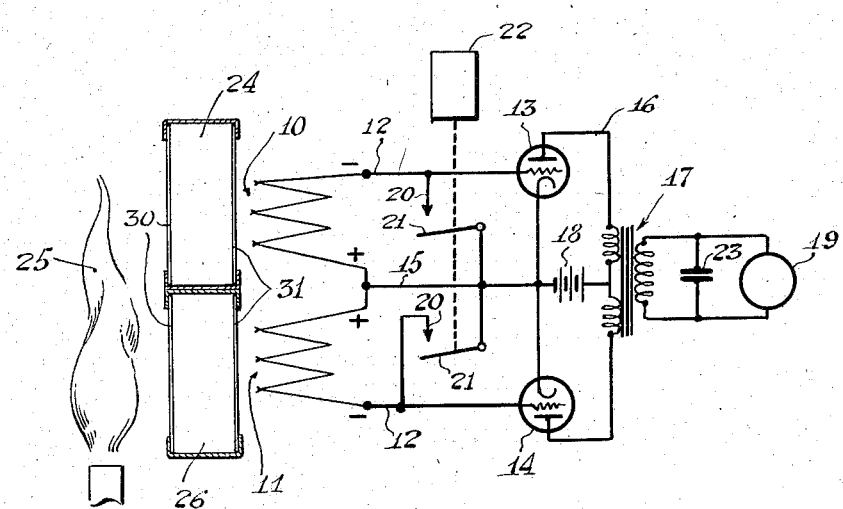
Figure 1 is a diagrammatic view illustrating my invention.

The illustrative embodiment of my invention shown in Figure 1 comprises a pair of radiation-sensing devices 10 and 11, which may be a pair of photoconductive or photovoltaic cells, or preferably a pair of thermopiles as shown. These thermopiles are connected in opposite polarity in a circuit 12 leading from grid to grid of a pair of vacuum tubes 13 and 14 themselves connected in push-pull arrangement, there being a lead connection 15 from the common terminal of these thermopiles to the cathodes of the two tubes so that the voltages of the thermopiles are applied from grid to cathode of the respective tubes. The plates of the tubes are connected by a circuit 16 through the primary of an output transformer 17. A D.-C. voltage source 18 is connected between the cathode and a center tap of this primary winding. The secondary winding is connected to the instrument 19 which may be an alarm device or a relay to control such device, or any other desired electrical apparatus. In order that the system will be operated on an alternating-current basis, a pair of contactors 20 and 21 are connected between the cathodes and the grids respectively. These contactors are driven by any suitable means 22 (diagrammatically indicated) to short the grids intermittently at a prescribed frequency so that the amplifier receives an A.-C. signal from the thermopiles. For this reason the output circuit is tuned sharply to that frequency by a condenser 23 connected across the secondary of the output transformer. Since the sensing devices 10 and 11 are connected in opposition, the alarm system responds according to the difference in the radiation-sensing condition of the two devices.

The two sensing devices are preferably made as nearly identical as possible and are also preferably arranged to have time constants such that they will respond to changes in radiation intensity within the order of one second. In the path of radiation to one sensing device, say the device 10, there is a cell or filter 24 which has a sharp band elimination characteristic adapted to absorb over a very narrow frequency range the peak energy in the radiation spectrum of the particular heat source 25 to be detected. In the path of radiation to the other sensing device 11 there may be provided a second cell or filter 26. In the present embodiment, this cell is to have little or no frequency discriminatory effect on the radiation to the sensing device 11, in view of which it may be filled with air or be even eliminated unless a discriminatory effect is desired from the windows of the cell as will later appear. In the present particular example, the heat source is a hydrocarbon flame or oil fire such as may occur on aircraft.

Figure 2:
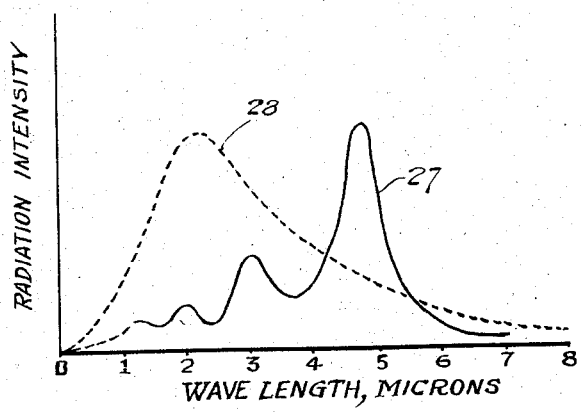
Figure 2 shows emission spectra of different heat sources for better illustrating the operation of my invention.

The emission spectrum of a hydrocarbon flame is typically as shown by the full-line curve 27 in Figure 2. This curve shows that the radiation energy is concentrated largely in a narrow band at a wave length of about 4.5 microns. In contrast, the radiation from a black body at 2200° F. is only mildly peaked at about 2 microns as shown by the dotted curve 28 in Figure 2.

The concentrated energy of a hydrocarbon flame in the narrow band at 4.5 microns is due to the carbon dioxide molecules in the flame. By the same token, carbon dioxide gas will have an equally concentrated absorption at the same wave length. In accordance with my invention, a radiation filter is provided in the transmission path to one of the sensing devices, which filter comprises carbon dioxide gas, the very same gas or vapor which causes the peak response in the radiation spectrum of the flame. Notwithstanding that the carbon dioxide filter has a very sharp absorption characteristic, this filter still will absorb of the order of half of the energy which otherwise would pass to the sensing device 10 because of the high concentration of energy in the narrow band at 4.5 microns. On the other hand, substantially the whole energy in the radiation spectrum is transmitted to the other sensing device 11 to cause the push-pull amplifier to become unbalanced with a resultant output voltage sufficient to operate the receiving instrument 19.

On the other hand, flames or heat sources which have a different heat radiation characteristic would influence both sensing devices about alike notwithstanding the presence of the carbon dioxide filter 24. For example, with respect to radiation from a black body having a characteristic as shown by the curve 28 in Figure 2, the carbon dioxide filter would blank out only a minor percentage of the energy with the result that the bulk of the energy from the black body would pass to both sensing devices. Since the sensing devices are connected in opposition, the voltages therefrom would be substantially cancelled out to prevent operation of the receiving instrument 19. Thus, for hydrocarbon flames, the system would respond because the two thermopiles would be heated unequally, while with all other flames or heat sources they would be heated substantially equally without causing the system to operate.

For the present particular purpose of selectively detecting only hydrocarbon flames, the filter cells must have windows 30 and 31 to transmit radiation at and beyond the region of 4.5 microns. A suitable material for these windows would be a sapphire which transmits up to about 6 microns. The windows might be absorptive at wave lengths substantially below 4.5 microns, say below 3 microns, by the use also of germanium. It will, however, be understood that if the windows have no absorption throughout the emission spectra of the heat sources or flames to be encountered, then maximum selectivity will be obtained as to the particular flame to be detected since then the energy absorbed by the filter 24 will represent a small percentage of the energy radiated from all the other flames but will represent a major percentage of the energy radiated from a hydrocarbon flame, with the result that as to all such other flames the amplifier will be maintained nearly in balance but with respect to a hydrocarbon flame the amplifier will be unbalanced to operate the receiving instrument 19.

In a different adaptation of the present system, the windows of the filter cells may be chosen so that they have a very narrow pass band adapted to pass only the peak energy in the emission spectrum of the hydrocarbon flame. When air is provided in one of such cells and carbon dioxide in the other, one filter cell will blank out completely all radiant energy to one of the sensing devices and the other filter cell will pass only the peak energy of the hydrocarbon flame. Such arrangement would still give a high degree of selectivity except for flames or heat sources which radiate most strongly at the wave length of sharpest radiation of the hydrocarbon flame, but sharpness of the radiation characteristic of the heat source at this pass band would no longer be a factor in determining the selectivity of the system.

From the foregoing description it will be understood that my invention is intended for selectively detecting a particular kind of heat radiation source. This form of detector is highly useful in aircraft applications where of necessity a fire alarm system must be highly sensitive to engine oil fires but must not be sensitive to all other forms of radiation such as from the sun, electric lamps, etc. The principle of my invention is however useful in other applications in connection with other types of flames both for measurement and control purposes, and no unnecessary limitation of the present particular illustrative embodiment is therefore intended.

The scope of my invention I endeavor to express according to the following claims.

I claim:

1. Electrical apparatus selectively responsive to a flame having a characteristic emission spectrum which is peaked at a given wave length due to a particular gaseous means present in the flame, comprising sensing means including two sensing devices one of which is exposed to radiant energy from said flame throughout a given spectrum including said certain wave length, a radiation filter between said flame and the other of said sensing devices containing said same gaseous means for absorbing the peak energy in said spectrum at said certain wave length while passing radiation throughout at least the remaining portion of said given spectrum, amplifying means connected to said sensing device for providing an output voltage according to the difference in response of said devices, and current-energizable means connected to the output of said amplifying means.

2. Electrical apparatus for detecting selectively hydrocarbon flame having an emission characteristic peaked in a narrow band of wave lengths due to the carbon dioxide molecules present in the flame, a pair of substantially identical radiation-sensing devices one of which is exposed to the radiant energy from said flame throughout at least a principal portion of the emission spectrum of said flame, a radiation filter interposed between said flame and the other of said sensing devices for absorbing radiant energy emitted by the carbon dioxide molecules in the flame while passing other radiation within said principal portion of said emission spectrum, and means for producing an electrical output according to the difference in response of said sensing devices.

3. A selective heat radiation detector adapted to respond only to a flame having a radiation characteristic peaked in a narrow band of wave lengths due to the presence of a particular gas in the flame, comprising a pair of heat-responsive devices one of which is exposed to radiation from said flame throughout at least a substantial portion of the emission spectrum of the flame, a filter between said flame and the other of said devices for absorbing radiant energy emitted by said gas in said flame while passing radiant energy throughout another portion of said spectrum, a circuit including said heat-responsive devices and including means to provide A.-C. voltages according to the heat-responsive condition of said devices respectively, a push-pull amplifier connected to said devices to provide a common source of power according to the difference in the heat-responsive condition of said devices, and electrical circuit means connected to the output of said amplifier.

4. The detector set forth in claim 3 wherein said heat-responsive devices are thermopiles connected in opposed relationship from grid to grid of said push-pull amplifier, including means connecting a junction point between said thermopiles to the cathode of said amplifier and a circuit interrupter for providing alternating voltages to the grids of said amplifier from said thermopiles respectively according to the D.-C. voltages generated by said thermopiles.

5. Electrical apparatus for selectively detecting a source of heat radiation having an emission spectrum peaked at a prescribed wave length, comprising a filter having means for absorbing the peak energy of said emission spectrum while passing radiation substantially throughout the remaining portion of said spectrum, a pair of radiation-sensing devices one of which is exposed to said source without appreciable selective absorption of the radiation energy therefrom and the other of which is exposed to said source through said filter, and means connected to said sensing devices for providing an electrical output according to the difference in response of said devices.

6. Electrical apparatus for selectively detecting a source of heat radiation having an emission throughout a given spectrum which is sharply peaked within a narrow band of frequencies within said spectrum, a filter having means for sharply absorbing energy within said narrow band while passing energy at other frequencies within said spectrum, a pair of radiation-sensing devices differently exposed to said source only by interposition of said filter between said source and one of said devices, and means connected to said sensing devices for providing an output according to the difference in response of said devices.

References Cited in the file of this patent

UNITED STATES PATENTS

| | | |
|---|---|---|
| 2,621,239 | Cade et al. | Dec. 9, 1952 |
| 2,718,597 | Heigl | Sept. 20, 1955 |
| 2,721,942 | Friel | Oct. 25, 1955 |
| 2,736,813 | Cherrier | Feb. 28, 1956 |
| 2,806,144 | Berger | Sept. 10, 1957 |